(12) United States Patent
Dai et al.

(10) Patent No.: US 10,055,167 B2
(45) Date of Patent: *Aug. 21, 2018

(54) CORRELATING STORAGE RINGS

(71) Applicant: International Business Machines Corporation, Armonk, NY (US)

(72) Inventors: Jiming Dai, Houston, TX (US); Xiao Lei Hu, Shanghai (CN); Mengze Liao, Shanghai (CN); Yangming Wang, Shanghai (CN); Xiao Hua Zeng, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/639,159

(22) Filed: Jun. 30, 2017

(65) Prior Publication Data

US 2018/0052610 A1 Feb. 22, 2018

Related U.S. Application Data

(63) Continuation of application No. 15/239,883, filed on Aug. 18, 2016.

(51) Int. Cl.
*G06F 12/00* (2006.01)
*G06F 3/06* (2006.01)

(52) U.S. Cl.
CPC ........... *G06F 3/065* (2013.01); *G06F 3/0619* (2013.01); *G06F 3/0652* (2013.01); *G06F 3/0683* (2013.01)

(58) Field of Classification Search
None
See application file for complete search history.

(56) References Cited

U.S. PATENT DOCUMENTS

| | | | |
|---|---|---|---|
| 9,210,219 B2 | 12/2015 | Darcy | |
| 2011/0138131 A1 | 6/2011 | Regni et al. | |
| 2013/0212068 A1* | 8/2013 | Talius | G06F 17/30144 707/639 |
| 2013/0268644 A1 | 10/2013 | Hardin et al. | |
| 2015/0127982 A1 | 5/2015 | Tung et al. | |
| 2016/0103714 A1 | 4/2016 | Konishi et al. | |

OTHER PUBLICATIONS

List of IBM Patents or Patent Applications Treated as Related. Filed Jun. 30, 2017. 2 pages.
Andersen et al., "FAWN: A Fast Array of Wimpy Nodes", SOSP'09, Oct. 11-14, 2009, Big Sky, MT, USA, Copyright 2009 ACM, 978-1-60558-752-3/09/10, 14 pages.
Dai et al., "Correlating Storage Rings", U.S. Appl. No. 15/239,883, filed Aug. 18, 2016.
Xie et al., "Two-Mode Data Distribution Scheme for Heterogeneous Storage in Data Centers", IEEE BigData 2015, Santa Clara, CA, USA, Oct. 30, 2015, 17 pages.

(Continued)

*Primary Examiner* — Baboucarr Faal
(74) *Attorney, Agent, or Firm* — Aaron N. Pontikos

(57) ABSTRACT

Correlating two storage rings based on an access rate for an object. A correlative dual hash ring includes a first ring of storage drives and a second ring of storage drives. Objects and replicas are allocated to either a first ring or a second ring.

20 Claims, 8 Drawing Sheets

(56) References Cited

OTHER PUBLICATIONS

Xie et al., "Unistore: A Unified Storage Architecture for Cloud Computing", retrieved on Jun. 2, 2016, 1 page, <https://www.google.co.in/url?sa=t&rct=j&q=&esrc=s&source=web&cd=5&cad=rja&uact=8&ved=0ahUKEwirsv-OgqzMAhUJbY4KHZDFBQYQFggxMAQ&url=http%3A%2F%2Fdiscl.cs.ttu.edu%2Flib%2Fexe%2Ffetch.php%3Fmedia%3Dmemberresources%3Acacposterapril2015xie.pptx&usg=AFQjCNHZ23-5BKS9s43VZ2PinktbgLVjpg&bvm=bv.120551593,d.c2E>.

"Efficient method of employing Flash storage as high speed tier for consistent hashing based object storage", An IP.com Prior Art Database Technical Disclosure, Disclosed Anonymously, IP.com No. IPCOM000245524D, IP.com Electronic Publication Date: Mar. 15, 2016, 7 pages, <http://ip.com/IPCOM/000245524>.

* cited by examiner

CORRELATING STORAGE RINGS

BACKGROUND

The present invention relates generally to the field of data storage, and more particularly to storage hash rings.

Hash rings are used in object storage to locate data and place data. Hash rings consist of storage drives interconnected in accordance with a storage architecture. Storage architecture defines object placement and replication policies. The storage drives within hash rings may be low performance storage drives, such as hard drive disks, or high performance storage drives, such as solid state drives. Basic hash rings map objects to different storage drives in a cyclical pattern based on the object's hash value. For example, if a hash ring consists of four storage drives (numbered "0," "1," "2," and "3," respectively), the object's hash value will be converted to decimal form and divided by 4. The object will be placed into a storage drive based on the resultant remainder. That is, if the remainder is 1, the object will be placed into the storage drive numbered "1."

Consistent hash rings are used to reduce object movement when disk storage drives are added or removed. Consistent hashing assigns each storage drive a range of hash values as opposed to numbering each storage drive. The range of hash values may be based on the first three letters of information in each hash value. If a new drive is added to the consistent hash ring, only the range of hash values must be changed.

SUMMARY

According to an aspect of the present invention, there is a method, computer program product, and/or system that performs the following operations (not necessarily in the following order): (i) identifying a first set of storage drives; (ii) organizing the first set of storage drives into a first ring; (iii) identifying a second set of storage drives; (iv) organizing the second set of storage drives into a second ring; and (v) correlating the first ring and the second ring. At least correlating the first ring and the second ring is performed by computer software running on computer hardware.

DETAILED DESCRIPTION

Figure 1:
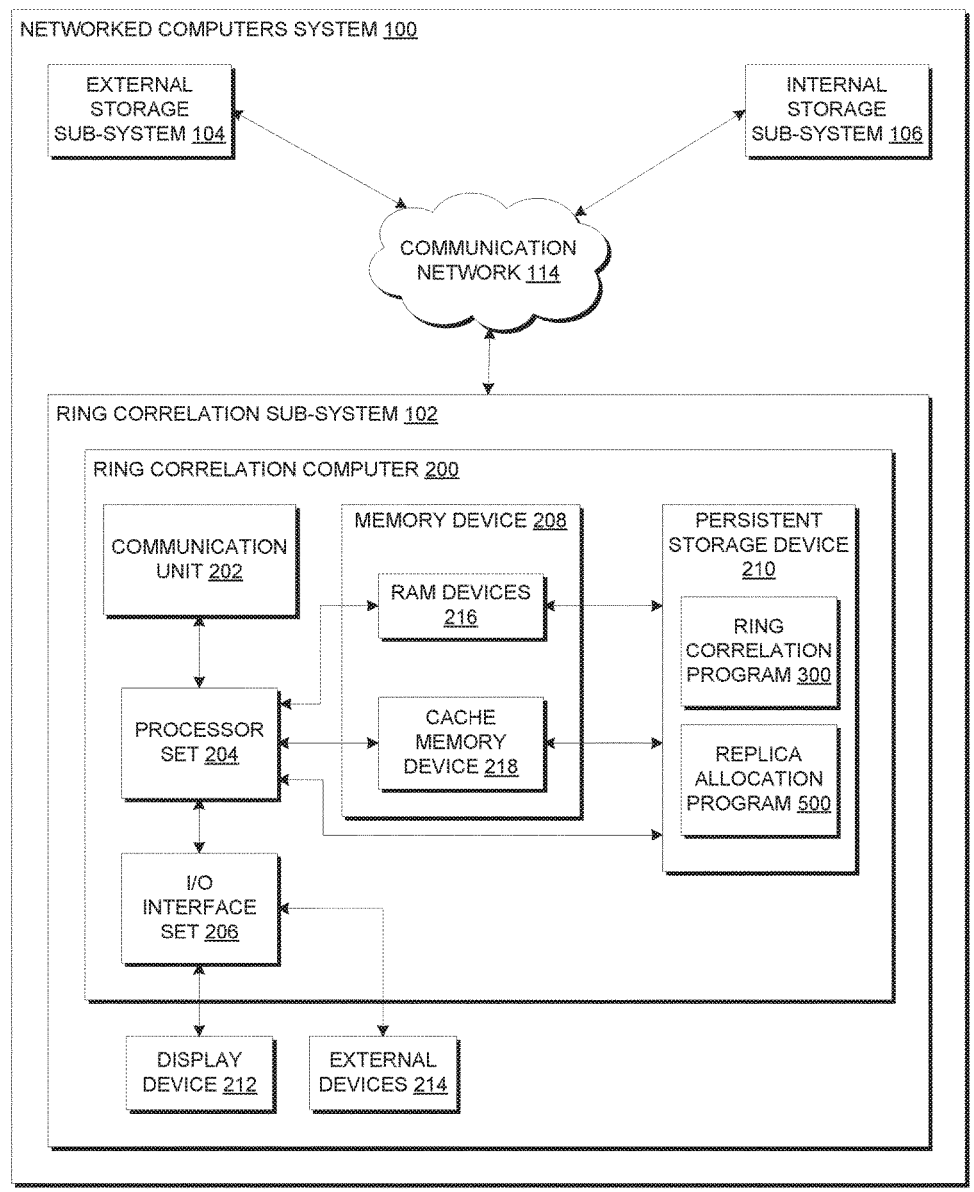
FIG. 1 is a block diagram view of a first embodiment of a system according to the present invention.

Correlating two storage rings based on an access rate for an object. A correlative dual hash ring includes a first ring of storage drives and a second ring of storage drives. Objects and replicas are allocated to either a first ring or a second ring. This Detailed Description section is divided into the following sub-sections: (i) Hardware and Software Environment; (ii) Example Embodiment; (iii) Further Comments and/or Embodiments; and (iv) Definitions.

I. Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: ring correlation sub-system 102; external storage sub-system 104; internal storage sub-system 106; and communication network 114. Ring correlation sub-system 102 contains: ring correlation computer 200; display device 212; and external devices 214. Ring correlation computer 200 contains: communication unit 202; processor set 204; input/output (I/O) interface set 206; memory device 208; and persistent storage device 210. Memory device 208 contains: random access memory (RAM) devices 216; and cache memory device 218. Persistent storage device 210 contains: ring correlation program 300.

Ring correlation sub-system 102 is, in many respects, representative of the various computer sub-systems in the present invention. Accordingly, several portions of ring correlation sub-system 102 will now be discussed in the following paragraphs.

Ring correlation sub-system 102 may be a laptop computer, a tablet computer, a netbook computer, a personal computer (PC), a desktop computer, a personal digital assistant (PDA), a smart phone, or any programmable electronic device capable of communicating with client sub-systems via communication network 114. Ring correlation program 300 is a collection of machine readable instructions and/or data that is used to create, manage, and control certain software functions that will be discussed in detail, below, in the Example Embodiment sub-section of this Detailed Description section.

Ring correlation sub-system 102 is capable of communicating with other computer sub-systems via communication network 114. Communication network 114 can be, for example, a local area network (LAN), a wide area network (WAN) such as the Internet, or a combination of the two, and can include wired, wireless, or fiber optic connections. In general, communication network 114 can be any combination of connections and protocols that will support communications between ring correlation sub-system 102 and client sub-systems.

Ring correlation sub-system 102 is shown as a block diagram with many double arrows. These double arrows (no separate reference numerals) represent a communications fabric, which provides communications between various components of ring correlation sub-system 102. This communications fabric can be implemented with any architecture designed for passing data and/or control information between processors (such as microprocessors, communications processors, and/or network processors, etc.), system memory, peripheral devices, and any other hardware components within a system. For example, the communications fabric can be implemented, at least in part, with one or more buses.

Memory device 208 and persistent storage device 210 are computer readable storage media. In general, memory device 208 can include any suitable volatile or non-volatile computer readable storage media. It is further noted that, now and/or in the near future: (i) external devices 214 may be able to supply some, or all, memory for ring correlation sub-system 102; and/or (ii) devices external to ring correlation sub-system 102 may be able to provide memory for ring correlation sub-system 102.

Ring correlation program 300 is stored in persistent storage device 210 for access and/or execution by one or more processors of processor set 204, usually through memory device 208. Persistent storage device 210: (i) is at least more persistent than a signal in transit; (ii) stores the program (including its soft logic and/or data) on a tangible medium (such as magnetic or optical domains); and (iii) is substantially less persistent than permanent storage. Alternatively, data storage may be more persistent and/or permanent than the type of storage provided by persistent storage device 210.

Ring correlation program 300 may include both substantive data (that is, the type of data stored in a database) and/or machine readable and performable instructions. In this particular embodiment (i.e., FIG. 1), persistent storage device 210 includes a magnetic hard disk drive. To name some possible variations, persistent storage device 210 may include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage device 210 may also be removable. For example, a removable hard drive may be used for persistent storage device 210. Other examples include optical and magnetic disks, thumb drives, and smart cards that are inserted into a drive for transfer onto another computer readable storage medium that is also part of persistent storage device 210.

Communication unit 202, in these examples, provides for communications with other data processing systems or devices external to ring correlation sub-system 102. In these examples, communication unit 202 includes one or more network interface cards. Communication unit 202 may provide communications through the use of either or both physical and wireless communications links. Any software modules discussed herein may be downloaded to a persistent storage device (such as persistent storage device 210) through a communications unit (such as communication unit 202).

I/O interface set 206 allows for input and output of data with other devices that may be connected locally in data communication with ring correlation computer 200. For example, I/O interface set 206 provides a connection to external devices 214. External devices 214 will typically include devices, such as a keyboard, a keypad, a touch screen, and/or some other suitable input device. External devices 214 can also include portable computer readable storage media, such as, for example, thumb drives, portable optical or magnetic disks, and memory cards. Software and data used to practice embodiments of the present invention (e.g., ring correlation program 300) can be stored on such portable computer readable storage media. In these embodiments, the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus, the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
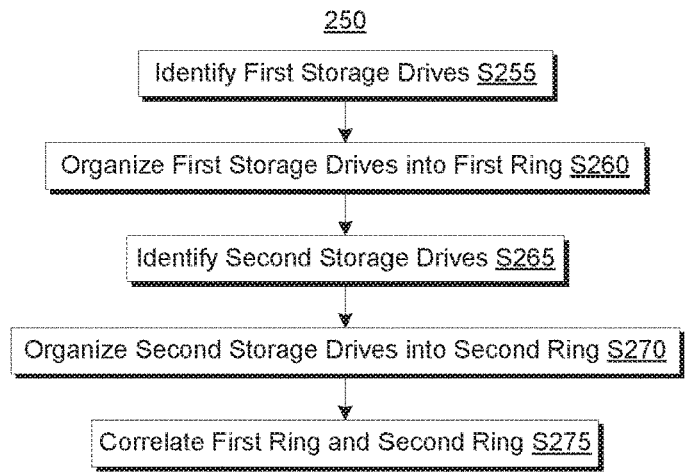
FIG. 2 is a flowchart showing a first embodiment method performed, at least in part, by the first embodiment system.
Figure 3:
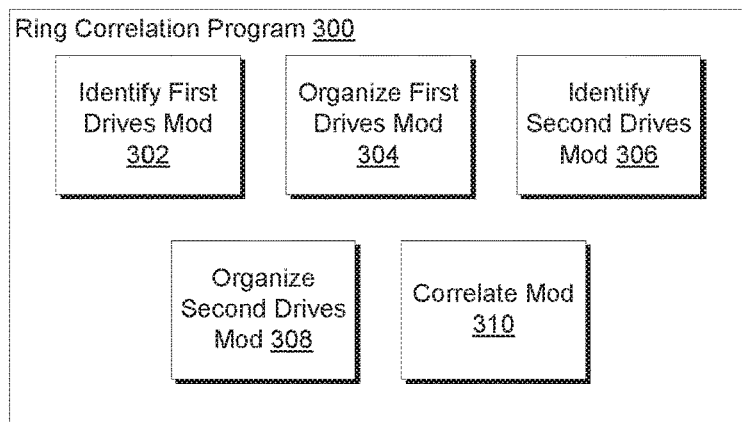
FIG. 3 is a block diagram view of a machine logic (e.g., software) portion of the first embodiment system.

FIG. 2 shows flowchart 250 depicting a method according to the present invention. FIG. 3 shows ring correlation program 300, which performs at least some of the method operations of flowchart 250. This method and associated software will now be discussed, over the course of the following paragraphs, with extensive reference to FIG. 2 (for the method operation blocks) and FIG. 3 (for the software blocks). In this example, Jane is organizing four low performance storage drives (hard disk drives) and three high performance storage drives (solid state drives).

Processing begins at operation S255, where identify first drives module ("mod") 302 identifies a first set of storage drives. A storage drive is a device for recording and/or processing information. In some embodiments of the present invention, identify first drives mod 302 identifies a first set of storage drives as an input. In some embodiments of the present invention, identify first drives mod 302 identifies a first set of storage drives as a subset of a larger set of storage drives. In such an embodiment, identify first drives mod 302 identifies a first set of storage drives based on predetermined criteria, such as whether the storage drive is a hard disk drive. In this example, identify first drives mod 302 identifies four low performance storage drives (hard disk drives) based on input from Jane. A hard disk drive is sometimes also called a hard disk, a hard drive, or a fixed disk. A hard disk drive is a data storage device used for storing and retrieving digital information using one or more rigid, rapidly rotating disks. In some embodiments of the present invention, a first set of storage drives are high performance storage drives. In some embodiments of the present invention, a first set of storage drives includes a combination of high performance storage drives and low performance storage drives. In general, a first set of storage drives includes storage drives that are distinct from a second set of storage drives.

Processing proceeds to operation S260, where organize first drives mod 304 organizes a first set of storage drives into a first ring. A first ring is sometimes called a hash ring. A hash ring is used in object storage to locate data and place data. In some embodiments of the present invention, organize first drives mod 304 creates a first ring by numbering each storage drive in a first set of s storage drives from 0 to s−1. In this example, where s=4, organize first drives mod 304 numbers the four storage drives "0," "1," "2," and "3," respectively. In other embodiments, organize first drives mod 304 creates a first ring by labeling each storage drive in a first set of storage drives with a range of hash values, such as a range based on the first three letters, the first three numbers, or some other aspect of a hash value. Hash values are associated with data files that are capable of being stored on a storage drive, such as a storage drive in a first set of drives. Mapping information for a data file with a hash function yields a hash value. Each data file that a storage drive stores has a hash value associated with it. In this example, organize first drives mod 304 numbers and/or labels each storage drive in a first set of storage drives based on input from Jane.

Processing proceeds to operation S265, where identify second drives mod 306 identifies a second set of storage drives. A second set of storage drives are distinct from a first set of storage drives. In some embodiments of the present invention, a second set of storage drives differ from a first set of storage drives because the second set of storage drives includes high performance storage drives whereas the first set of storage drives include low performance storage drives. In some embodiments of the present invention, identify second drives mod 306 identifies a second set of storage drives as an input. In some embodiments of the present invention, identify second drives mod 306 identifies a second set of storage drives as a subset of a larger set of storage drives. In such an embodiment, identify second drives mod 306 identifies a second set of storage drives based on predetermined criteria, such as whether a storage drive is a solid state drive. In this example, identify second drives mod 306 identifies three high performance storage drives (solid state drives) based on input from Jane. A solid state drive is a type of non-volatile computer storage that stores and retrieves digital information using only electronic circuits, without any involvement of moving mechanical parts. In some embodiments of the present invention, a second set of storage drives are low performance storage drives. In some embodiments of the present invention, a second set of storage drives includes a combination of high performance storage drives and low performance storage drives. In general, a second set of storage drives includes storage drives that are distinct from a first set of storage drives.

Processing proceeds to operation S270, where organize second drives mod 308 organizes a second set of storage drives into a second ring. A second ring is sometimes called a hash ring. A second ring is distinct from a first ring. In some embodiments, a second ring is created in a manner similar to a first ring; however, organize second drives mod 308 organizes a second set of storage drives into the second ring. In some embodiments, organize second drives mod 308 creates a second ring by numbering each storage drive in a second set of n storage drives from 0 to n−1. In this example, where n=3, organize second drives mod 308 numbers the three storage drives "0," "1," and "2," respectively. In other embodiments, organize second drives mod 308 creates a second ring by labeling each storage drive in a second set of storage drives with a range of hash values, such as a range based on the first three letters, the first three numbers, or some other aspect of a hash value. Hash values are associated with data files that are capable of being stored on a storage drive, such as a storage drive in a second set of drives. Mapping information for a data file with a hash function yields a hash value. Each data file that a storage drive stores has a hash value associated with it. In this example, organize second drives mod 308 numbers and/or label each storage drive in a second set of storage drives based on input from Jane.

Processing terminates at operation S275, where correlate mod 310 correlates a first ring and a second ring. In some embodiments of the present invention, correlate mod 310 correlates a first ring and a second ring by receiving a data file and replica data files as input and allocating each data file and replica data file to either a first ring or a second ring. In some embodiments of the present invention, correlate mod 310 correlates a first ring and a second ring based on input from Jane. In some embodiments, correlate mod 310 correlates a first ring and a second ring in a manner depicted by FIG. 4.

Figure 4:
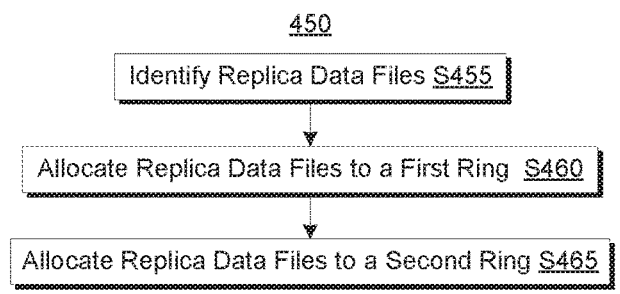
FIG. 4 is a flowchart showing a second embodiment method performed, at least in part, by the first embodiment system.
Figure 5:
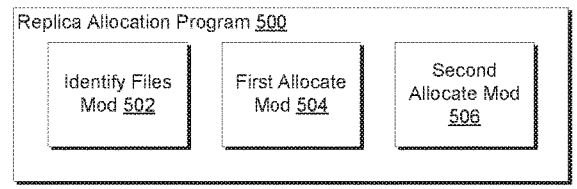
FIG. 5 is a block diagram view of a machine logic (e.g., software) portion of the first embodiment system.

FIG. 4 shows flowchart 450 depicting a method according to the present invention. FIG. 5 shows program 500, which performs at least some of the method operations of flowchart 450. This method and associated software will now be discussed, over the course of the following paragraphs, with extensive reference to FIG. 4 (for the method operation blocks) and FIG. 5 (for the software blocks). In this example Jane is storing five replica data files (an original file and four replica data files).

Processing begins at operation S455, where identify files mod 502 identifies replica data files. Replica data files includes an original data file and any replica data files. In some embodiments, identify files mod 502 identifies an original data file and replicates the original data file to yield replica data files. In some embodiments, identify files mod 502 receives all replica data files as input. In this example, identify files mod 502 identifies five replica data files (an original file and four replica data files) based on input from Jane. An access rate is associated with replica data files. In some embodiments, an access rate is the number of times a file is accessed during a unit of time, such as one second. An access rate is sometimes called a data transfer rate. A data transfer rate is the amount of digital data that is moved from one place to another in a given time. In some embodiments, an access rate is a speed of travel, such as a speed at which data can be moved between two devices, such as from a disk drive to an internal memory of a computer. In some embodiments, an access rate is a fixed value. In some embodiments, an access rate is a value that is updated dynamically based on network connectivity factors, such as bandwidth. In this example, the access rate is fifty bytes per second. In this example, each of the five replica data files are associated with the same access rate. In other embodiments, each replica data file is associated with a distinct access rate.

Processing proceeds to operation S460, where first allocate mod 504 allocates replica data files to a first ring, such as the first ring created at operation S260. In some embodiments, first allocate mod 504 allocates replica data files to a first ring based on an access rate associated with replica data files. In some embodiments, first allocate mod 504 determines if an access rate is above, at, or below a predetermined threshold. In this example, the predetermined threshold is sixty times accessed per second. In some embodiments, first allocate mod 504 allocates particular replica data files to a first ring based on whether an access rate is above or below a predetermined threshold and based on predetermined rules. In some embodiments, predetermined rules are based on a number of replicas. In this example, where there are five replica data files, the predetermined rule is that first allocate mod 504 allocates two of the five replica data files (including the original data file) to the first ring if the access rate is below the predetermined threshold. In this example, the access rate is below the predetermined threshold; therefore, first allocate mod 504 allocates two of the five replica data files (the original data file and a first replica data file) to the first ring.

In this example, first allocate mod 504 allocates each data file to a particular storage drive within the first ring by dividing a hash value for each data file by 4 and determining the remainder. In this example, a hash value for the original data file yields a remainder of 0, and a hash value for the first replica data file yields a remainder of 2. In this example, first allocate mod 504 allocates the original data file is allocated to the storage drive labeled "0" within the first ring and the first replica data file to the storage drive labeled "2" within the first ring. In other embodiments, first allocate mod 504 follows other predetermined rules with other predetermined criteria. In other embodiments, first allocate mod 504 determines a hash value for each data file by mapping information associated with each data file with a hash function. In some embodiments of the present invention, first allocate mod 504 allocates replica data files to a first ring based on those particular replica data files not being allocated to a second ring.

Processing terminates at operation S465, where second allocate mod 506 allocates replica data files to a second ring, such as the second ring created at operation S270. In some embodiments, second allocate mod 506 allocates replica data files to a second ring based on an access rate associated with replica data files. In some embodiments, second allocate mod 506 determines if an access rate is above or below a predetermined threshold. In this example, the predetermined threshold is sixty times accessed per second. In some embodiments, second allocate mod 506 allocates particular replica data files to a second ring based on whether an access rate is above, at, or below a predetermined threshold and based on predetermined rules. In some embodiments, predetermined rules are based on a number of replicas. In this example, where there are five replica data files, the predetermined rule is that second allocate mod 506 allocates three of the five replica data files (not including the original data file) to the second ring if the access rate is above or equal to the predetermined threshold. In this example, the access rate is above the predetermined threshold; therefore, second allocate mod 506 allocates three of the five replica data files (a second replica data file, a third replica data file, and a fourth replica data file) to the second ring.

In this example, second allocate mod 506 allocates each data file to a particular storage drive within the second ring by dividing a hash value associated with each data file by 3 and determining a remainder. In this example, a hash value for the second replica data file yields a remainder of 0, a hash value for the third replica data file yields a remainder of 0, and a hash value for the fourth replica data file yields a remainder of 2. In this example, second allocate mod 506 allocates the second replica data file to the storage drive labeled "0" within the second ring, the third replica data file to the storage drive labeled "0" within the second ring, and the fourth replica data file to the storage drive labeled "2" within the second ring. In other embodiments, second allocate mod 506 follows other predetermined rules with other predetermined criteria. In other embodiments, second allocate mod 506 determines a hash value for each data file by mapping information for each data file with a hash function. In some embodiments of the present invention, second allocate mod 506 allocates replica data files to a second ring based on those particular replica data files not being allocated to a first ring.

III. Further Comments and/or Embodiments

Some embodiments of the present invention recognize facts, potential problems, and/or potential areas for improvement with respect to the current state of the art. For example, if all the drives in the consistent storage hash ring are considered to be the same, which means that when a solid state drive is added to a ring, it is difficult to take full advantage of the solid state drive performance capabilities. Current object storage is not optimized to use hard disk drives and solid state drives together as a hybrid storage system. Cloud computing platforms may provide storage policies to implement a storage tier within a consistent hash ring, but all replicas of one object will be stored on the same ring. The solid state drive performance capabilities are wasted in such an implementation.

Embodiments of the present invention provide a method for using solid state drives as a high performance tier in object storage, without wasting capacity, by creating a correlative hybrid hash ring. In some embodiments, the correlative hybrid hash ring protects the object from single point failure and improves the object access performance by putting the hottest objects in the high performance storage drives. A hot object is an object with an access rate above a predetermined threshold. The hottest object is an object with the highest access rate.

In some embodiments, a correlative hybrid hash ring correlates a low-speed ring and high-speed ring. The low-speed ring is built with low performance storage drives (e.g. hard disk drives), and the high-speed ring is built with high performance storage drives (e.g. solid state drives). One or more replicas of an object will be moved to the high-speed ring based on an access rate for that object.

In some embodiments, the low-speed and high-speed rings are not independent. In such embodiments, the physical location of the low performance storage drives and high performance storage drives is taken into consideration during the ring building. In such an embodiment, the correlative dual hash ring will avoid single point failure.

In some embodiments, where there are cold objects in an n-replica object storage model, the set of n replicas will be placed on the low speed ring. For example, in an n=3 replica object storage composed by hard disk drives and solid disk drives, all three replicas will be placed in hard disk storage drives.

In some embodiments, a background process will move the less hot objects to the low-speed ring from the high-speed ring, which will ensure the hottest objects are stored on the high-speed ring. Such a background process includes creating a shadow replica. A shadow replica is a point-in-time copy of an object.

In some embodiments, where there are hot objects in an n-replica storage model, n−m replicas will be placed on the low-speed ring and the other m replicas will be placed on the high-speed ring. For example, an object is mapping to a second partition and it is a hot object. The three replicas are placed on a first low-speed drive, a second low-speed drive, and a first high-speed drive, respectively. In such an example, the original replica is replaced by a shadow replica. After some time, the object may become cold and a background process will delete the shadow replica and restore the original replica. For example, in a 3-replica object storage scenario where the hash ring consists of a low-speed ring and a high-speed ring, one replica is place on the high-speed ring and the other two replicas will be placed on the low-speed ring because n=3 and m=1, where n is the number of replicas and m is the number of original files.

In some embodiments, hot data is stored in the high-speed drives. In some embodiments, object read/write performance improves due to placement within the high-speed hash ring. For example, an object on a high-speed hash ring can be read more quickly than an object on a low-speed drive. In some embodiments the capacity of the high-speed hash ring is not wasted by filling the high-speed hash ring with cold data. In some embodiments, there is minimal change to a current storage system. For example, the physical architecture of the current storage system would remain in place, but the allocation of data and replica files would change.

In some embodiments, this method in a cloud computing platform is implemented using a unique-as-possible algorithm to build the correlative dual hash ring. In some embodiments, a shadow replica (m-w) is added into a lookup table while keeping the total replica count consistent at n, which means one of the normal replica will be replaced by a shadow replica for hot objects. A unique-as-possible algorithm identifies the least-used place in a cluster of storage disk drives to place an object.

In some embodiments, the method to create a correlative hybrid ring includes different tiered storage for object storage. Different tiers are based on geography location, such as regions, zones, nodes, and disks. Data placement is based on such a method. Objects may be read and updated based on such a method. The correlative dual hash ring may be managed based on such a method.

Figure 6:
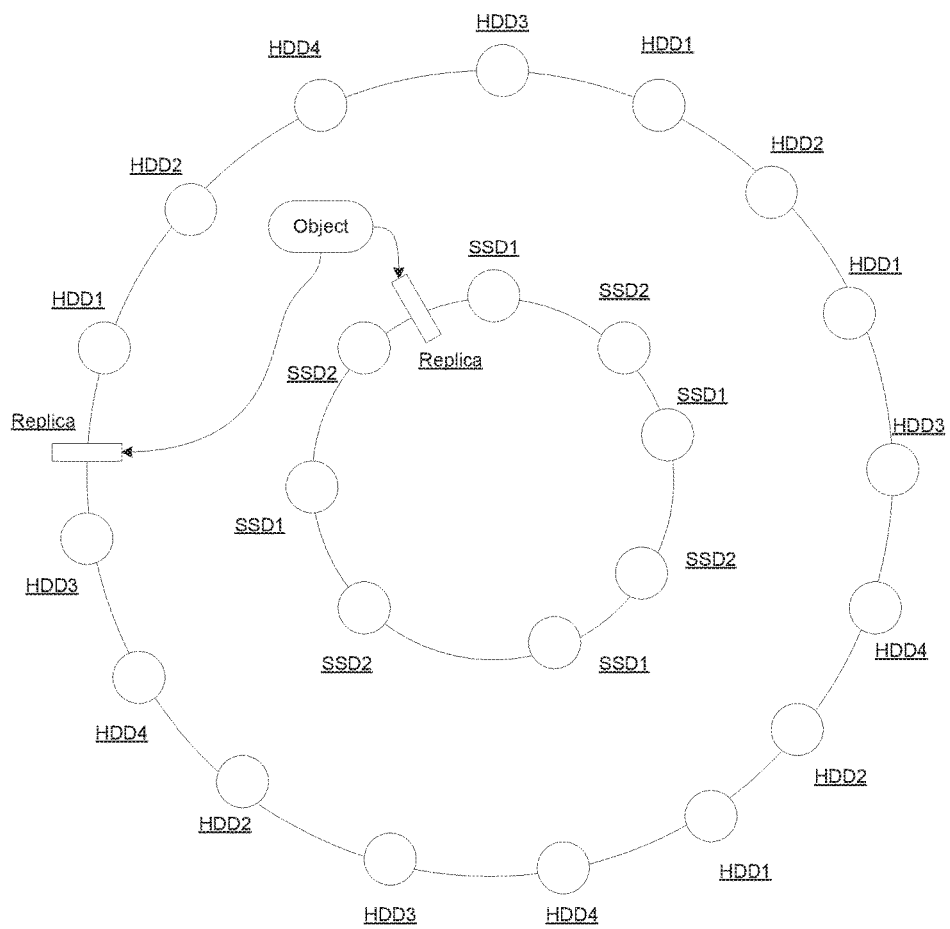
FIG. 6 is an exemplary correlative dual hash ring showing an object with multiple replicas.

FIG. 6 illustrates an exemplary correlative dual hash ring. The outer ring is a low-speed ring and is composed of four hard disk drives (HDD1, HDD2, HDD3, and HDD4). Each different hash range is owned by the nearest clockwise disk drive. The inner ring is a high speed ring and is composed of two solid state drives (SSD1 and SSD2) and each different hash range is owned by the nearest clockwise disk drive. In this example, one replica of the objects stored on HDD1 in the low-speed ring and another replica is stored on SSD1 in the high-speed ring.

Figure 7:
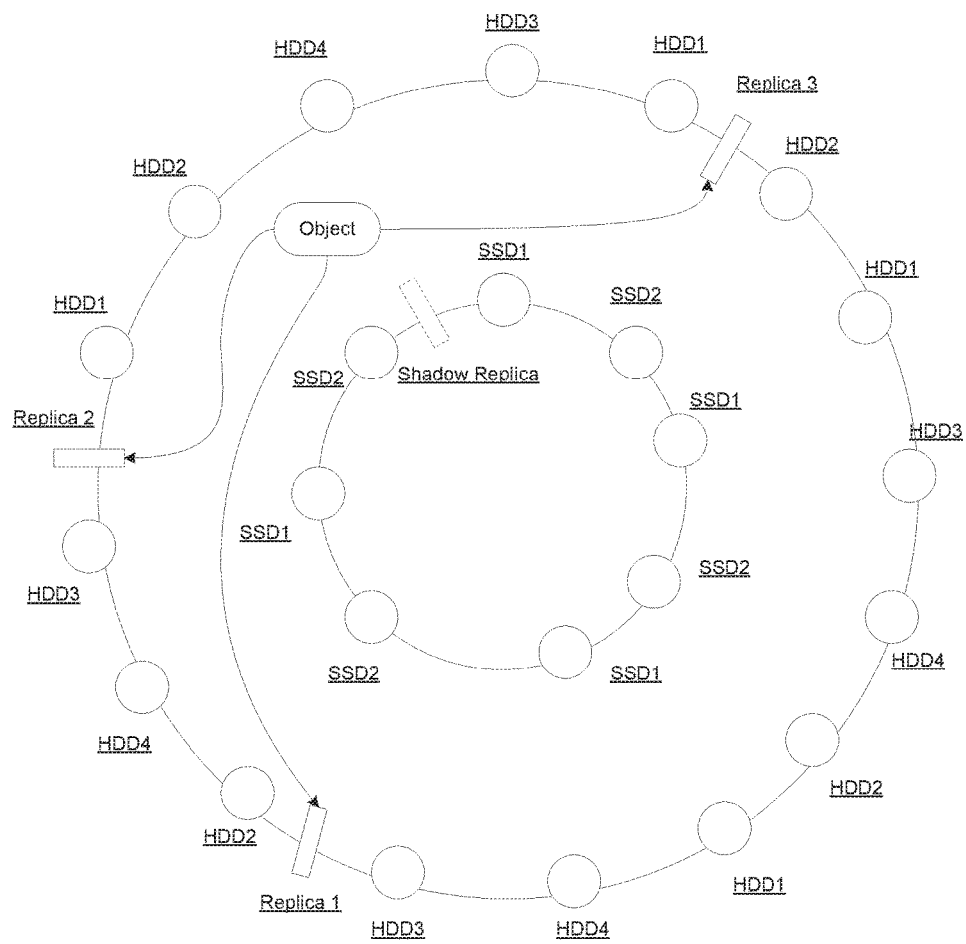
FIG. 7 is an exemplary correlative dual hash ring showing a shadow replica.

FIG. 7 illustrates an exemplary correlative dual hash ring, similar to the correlative dual hash ring of FIG. 6. In this example, all three replicas of the object are stored on the low-speed ring, but there is a shadow replica on the high-speed ring. The shadow replica is a placeholder in the high-speed ring. In this example, the shadow replica does not take any capacity. In this example the object is cold, meaning the object has an access rate below a threshold.

Figure 8:
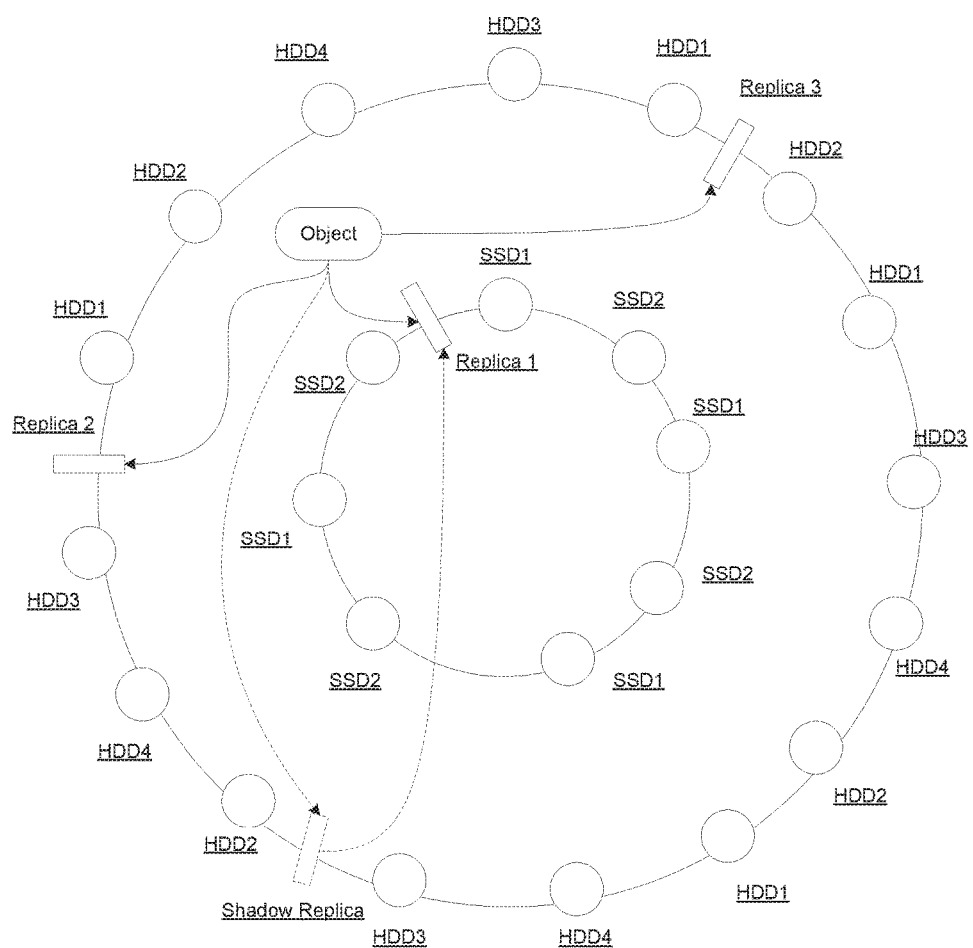
FIG. 8 is an exemplary correlative dual hash ring showing allocation of a replica to a high-speed ring.

FIG. 8 illustrates an exemplary correlative dual hash ring, similar to the correlative dual hash ring of FIG. 7. In this example, two replicas of the object are stored on the low speed ring, and the other replica of the object is stored on the high-speed ring. In this example, a background process moves one replica in the low-speed ring to the high-speed ring and stores the placeholder of the shadow replica in the high-speed ring. In this example, the object is hot, meaning the object has an access rate above a threshold.

Figure 9:
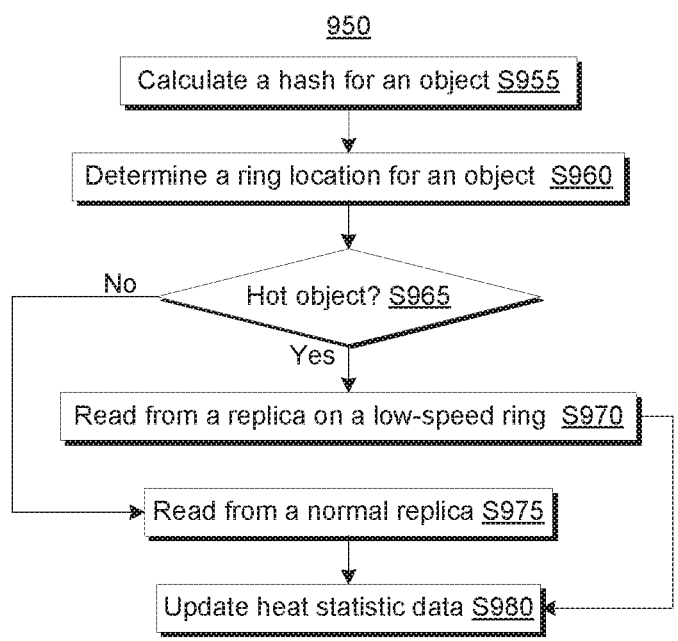
FIG. 9 is a flowchart showing an object read process.

FIG. 9 shows flowchart 950 depicting an object read process. Processing begins at operation S955, where an object read process calculates a hash for an object. Processing proceeds to operation S960, where an object read process determines a ring location for an object. Processing proceeds to decision operation S965, where an object read process determines whether an object is hot. Following the "Yes" branch from operation S965, processing proceeds to operation S970, where an object read process reads from a replica on a high-speed ring. Processing terminates at operation S980, where an object read process updates heat statistic data. Following the "No" branch from operation S965, processing proceeds to operation S975, where an object read process reads from a normal replica. Processing terminates at operation S980, where an object read process updates heat statistic data.

Figure 10:
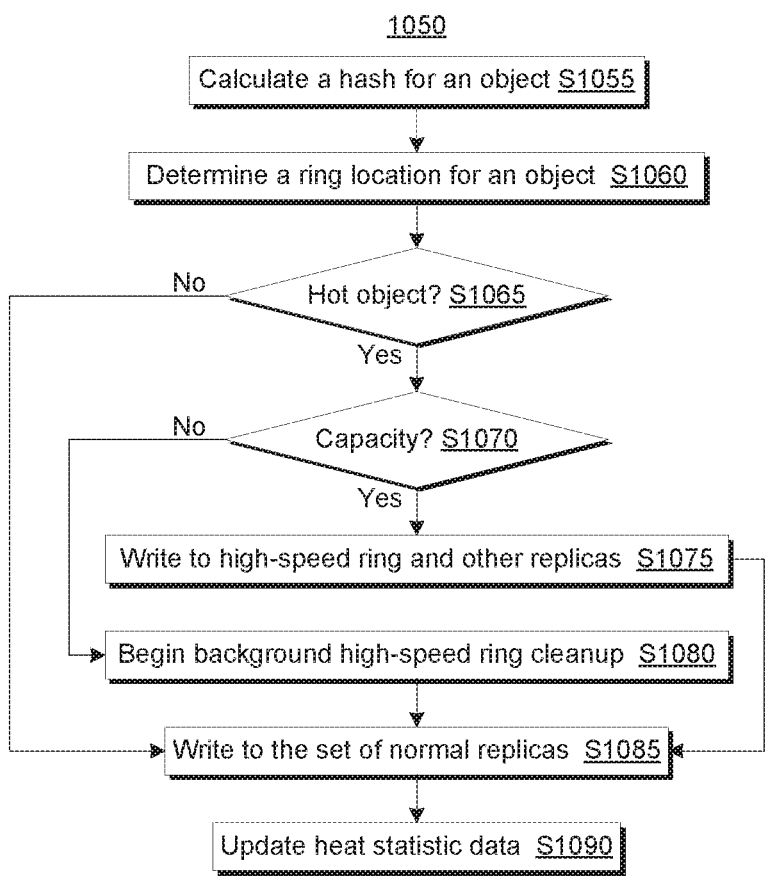
FIG. 10 is a flowchart showing an object update process.

FIG. 10 shows flowchart 1050 depicting an object update process. Processing begins at operation S1055, where an object update process calculates a hash for an object. Processing proceeds to operation S1060, where an object update process determines a ring location for an object. Processing proceeds to decision operation S1065, where an object update process determines whether an object is hot. Following the "No" branch from operation S1065, processing proceeds to operation S1085, where an object update process writes to the set of normal replicas. Processing terminates at operation S1090, where an object update process updates heat statistic data. Following the "Yes" branch from operation S1065, processing proceeds to decision operation S1070, where an object update process determines whether capacity is available for an object. Following the "Yes" branch from operation S1070, processing proceeds to operation S1075, where an object update process writes to a high-speed ring and other replicas. Processing proceeds to operation S1085, where an object update process writes to the set of normal replicas. Processing terminates at operation S1090, where an object update process updates heat statistic data. Following the "No" branch from operation S1070, processing proceeds to operation S1080, where an object update process begins a background high-speed ring cleanup. A background cleanup process is further illustrated at FIG. 11. Processing proceeds to operation S1085, where an object update process write to the set of normal replicas. Processing terminates at operation S1090, where an object update process updates heat statistic data.

Figures 11, 12:
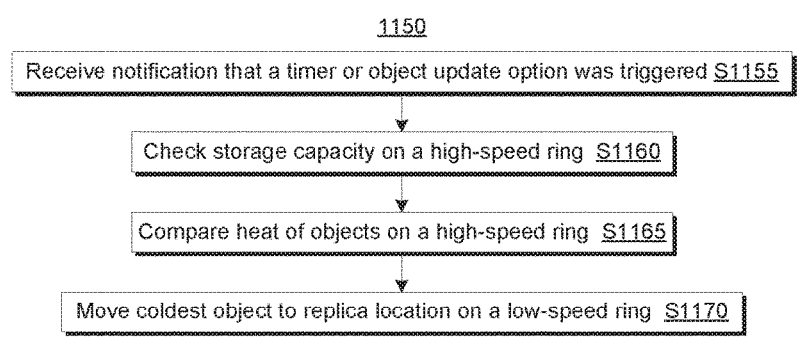
FIG. 11 is a flowchart showing a background cleanup process.
FIG. 12 is an exemplary lookup table.

FIG. 11 shows flowchart 1150 depicting a background cleanup process. Processing begins at operation S1155, where a background cleanup process receives a notification that a timer or object update option was triggered. A timer may be based on a schedule. For example, in some embodiments, a background cleanup process is scheduled to take place every hour. Processing proceeds to operation S1160, where a background cleanup process checks a storage capacity on a high-speed ring. Processing proceeds to operation S1165, where a background cleanup process compares the relative heat of objects on a high-speed ring. Processing terminates at operation S1170, where a background cleanup process moves the coldest object to a replica location on a low-speed ring.

FIG. 12 shows an exemplary lookup table created by the dual ring build process, with columns numbers to represent a partition and rows labeled to represent a specific replica. In such an example, there are three normal replicas and one shadow replica for each partition. The normal replicas will be placed on the hard drives, such as D8, D3, and D19. The shadow replica will be place on the solid state drives, such as S5. "R1:S5" for the partition means that if the object in the partition becomes hot, the replica R9 will be moved from D8 to S5 in the high-speed ring.

IV. Definitions

"Present invention" does not create an absolute indication and/or implication that the described subject matter is covered by the initial set of claims, as filed, by any as-amended set of claims drafted during prosecution, and/or by the final set of claims allowed through patent prosecution and included in the issued patent. The term "present invention" is used to assist in indicating a portion or multiple portions of the disclosure that might possibly include an advancement or multiple advancements over the state of the art. This understanding of the term "present invention" and the indications and/or implications thereof are tentative and provisional and are subject to change during the course of patent prosecution as relevant information is developed and as the claims may be amended.

"Embodiment," see the definition for "present invention."

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists at more than one item; there must exist at least two items, but there can also be three, four, or more items.

"Includes" and any variants (e.g., including, include, etc.) means, unless explicitly noted otherwise, "includes, but is not necessarily limited to."

A "user" or a "subscriber" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" or "subscribers" acting as a single "user" or "subscriber."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

A "module" is any set of hardware, firmware, and/or software that operatively works to do a function, without regard to whether the module is: (i) in a single local proximity; (ii) distributed over a wide area; (iii) in a single proximity within a larger piece of software code; (iv) located within a single piece of software code; (v) located in a single storage device, memory, or medium; (vi) mechanically connected; (vii) electrically connected; and/or (viii) connected in data communication. A "sub-module" is a "module" within a "module."

A "computer" is any device with significant data processing and/or machine readable instruction reading capabilities including, but not necessarily limited to: desktop computers; mainframe computers; laptop computers; field-programmable gate array (FPGA) based devices; smart phones; personal digital assistants (PDAs); body-mounted or inserted computers; embedded device style computers; and/or application-specific integrated circuit (ASIC) based devices.

"Electrically connected" means either indirectly electrically connected such that intervening elements are present or directly electrically connected. An "electrical connection" may include, but need not be limited to, elements such as capacitors, inductors, transformers, vacuum tubes, and the like.

"Mechanically connected" means either indirect mechanical connections made through intermediate components or direct mechanical connections. "Mechanically connected" includes rigid mechanical connections as well as mechanical connection that allows for relative motion between the mechanically connected components. "Mechanically connected" includes, but is not limited to: welded connections; solder connections; connections by fasteners (e.g., nails, bolts, screws, nuts, hook-and-loop fasteners, knots, rivets, quick-release connections, latches, and/or magnetic connections); force fit connections; friction fit connections; connections secured by engagement caused by gravitational forces; pivoting or rotatable connections; and/or slidable mechanical connections.

A "data communication" includes, but is not necessarily limited to, any sort of data communication scheme now known or to be developed in the future. "Data communications" include, but are not necessarily limited to: wireless communication; wired communication; and/or communication routes that have wireless and wired portions. A "data communication" is not necessarily limited to: (i) direct data communication; (ii) indirect data communication; and/or (iii) data communication where the format, packetization status, medium, encryption status, and/or protocol remains constant over the entire course of the data communication.

The phrase "without substantial human intervention" means a process that occurs automatically (often by operation of machine logic, such as software) with little or no human input. Some examples that involve "no substantial human intervention" include: (i) a computer is performing complex processing and a human switches the computer to an alternative power supply due to an outage of grid power so that processing continues uninterrupted; (ii) a computer is about to perform resource intensive processing and a human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

"Automatically" means "without any human intervention."

The term "real time" (and the adjective "real-time") includes any time frame of sufficiently short duration as to provide reasonable response time for information processing as described. Additionally, the term "real time" (and the adjective "real-time") includes what is commonly termed "near real time," generally any time frame of sufficiently short duration as to provide reasonable response time for on-demand information processing as described (e.g., within a portion of a second or within a few seconds). These terms, while difficult to precisely define, are well understood by those skilled in the art.

What is claimed is:

1. A method comprising:
    allocating each replica data file in a set of replica data files for a data object to a storage drive in a first ring of storage drives based, at least in part, on an access rate for the data object being below a predetermined threshold;
    creating a shadow replica for a first replica data file in the set of replica data files, wherein the shadow replica is a placeholder for a location of available storage space on a second storage drive in a second ring of storage drives;
    moving the first replica data file from the first storage drive to the second storage drive in the second ring of storage drives based, at least in part, on the access rate for the data object being above the predetermined threshold; and deleting the shadow replica for the first replica data file based, at least in part, on the access rate for the data object being below the predetermined threshold level.

2. The method of claim 1, wherein the first ring of storage drives and the second ring of storage drives are hash rings.

3. The method of claim 1, wherein:
the first ring of storage drives includes at least a first set of low performance storage drives; and
the second ring of storage drives includes at least a first set of high performance storage drives.

4. The method of claim 1, further comprising comparing current access rates for each replica data file in the set of replica data files.

5. The method of claim 4, wherein comparing current access rates for each replica data file in the set of replica data files is based on receiving a notification that at least one of a timer option and an object update option is triggered.

6. The method of claim 1, further comprising checking a storage capacity of the second ring of storage drives.

7. The method of claim 1, further comprising adding the shadow replica to a lookup table.

8. The method of claim 1, wherein the shadow replica does not utilize any storage space on the second ring of storage drives.

9. The method of claim 1, wherein deleting the shadow replica for the first replica data file further comprises:
restoring the first replica data file to the first ring of storage drives.

10. A computer program product, the computer program product comprising one or more computer readable storage media and program instructions stored on the one or more computer readable storage media, the program instructions comprising instructions to:
allocate each replica data file in a set of replica data files for a data object to a storage drive in a first ring of storage drives based, at least in part, on an access rate for the data object being below a predetermined threshold;
create a shadow replica for a first replica data file in the set of replica data files, wherein the shadow replica is a placeholder for a location of available storage space on a second storage drive in a second ring of storage drives;
move the first replica data file from the first storage drive to the second storage drive in the second ring of storage drives based, at least in part, on the access rate for the data object being above the predetermined threshold; and
delete the shadow replica for the first replica data file based, at least in part, on the access rate for the data object being below the predetermined threshold level.

11. The computer program product of claim 10, wherein the first ring of storage drives and the second ring of storage drives are hash rings.

12. The computer program product of claim 10, wherein:
the first ring of storage drives includes at least a first set of low performance storage drives; and
the second ring of storage drives includes at least a first set of high performance storage drives.

13. The computer program product of claim 10, further comprising program instructions to compare current access rates for each replica data file in the set of replica data files.

14. The computer program product of claim 13, wherein the program instructions to compare current access rates for each replica data file in the set of replica data files is based on receiving a notification that at least one of a timer option and an object update option is triggered.

15. The computer program product of claim 10, further comprising program instructions to check a storage capacity of the second ring of storage drives.

16. The computer program product of claim 10, further comprising program instructions to add the shadow replica to a lookup table.

17. The computer program product of claim 10, wherein the shadow replica does not utilize any storage space on the second ring of storage drives.

18. The computer program product of claim 10, wherein the program instructions to delete the shadow replica for the first replica data file further comprises program instructions to:
restore the first replica data file to the first ring of storage drives.

19. A computer system, the computer system comprising:
one or more computer processors;
one or more computer readable storage media;
computer program instructions;
the computer program instructions being stored on the one or more computer readable storage media for execution by the one or more computer processors; and
the computer program instructions comprising instructions to:
allocate each replica data file in a set of replica data files for a data object to a storage drive in a first ring of storage drives based, at least in part, on an access rate for the data object being below a predetermined threshold;
create a shadow replica for a first replica data file in the set of replica data files, wherein the shadow replica is a placeholder for a location of available storage space on a second storage drive in a second ring of storage drives;
move the first replica data file from the first storage drive to the second storage drive in the second ring of storage drives based, at least in part, on the access rate for the data object being above the predetermined threshold; and
delete the shadow replica for the first replica data file based, at least in part, on the access rate for the data object being below the predetermined threshold level.

20. The computer system of claim 19, wherein the first ring of storage drives and the second ring of storage drives are hash rings.

* * * * *